United States Patent [19]

Hoffmann

[11] Patent Number: 5,283,543
[45] Date of Patent: Feb. 1, 1994

[54] MULTI-PHASE CURRENT MONITORING DEVICE

[75] Inventor: Bernhard Hoffmann, Starnberg, Fed. Rep. of Germany

[73] Assignee: Magnet-Bahn GmbH, Starnberg, Fed. Rep. of Germany

[21] Appl. No.: 697,418

[22] Filed: May 9, 1991

[30] Foreign Application Priority Data

May 9, 1990 [DE] Fed. Rep. of Germany ....... 4014820

[51] Int. Cl.$^5$ ............................................ H01H 75/00
[52] U.S. Cl. .......................................... 335/8; 335/18
[58] Field of Search ...................................... 335/8–10, 335/6, 19, 18; 361/42–49

[56] References Cited

U.S. PATENT DOCUMENTS 3,546,531 12/1970 Miner ..................................... 361/31
3,932,825 1/1976 De Torre ................................ 335/10

FOREIGN PATENT DOCUMENTS

2004664 7/1971 Fed. Rep. of Germany .
242968 10/1925 United Kingdom .

Primary Examiner—Lincoln Donovan
Attorney, Agent, or Firm—Spencer, Frank & Schneider

[57] ABSTRACT

An overcurrent relay device is provided for monitoring current in a multi-phase current system including separate conductors each carrying a respective one of the current phases between a multi-phase current source and a load. The current system includes a system switch having a displaceable contact for switching the multi-phase current on and off. A plurality of electromagnets are provided, each including a magnetic core having a core pole and being associated with a respective one of the conductors for generating a magnetic attraction force in the vicinity of the core pole. The core poles all face in the same direction. An armature is rotatably mounted adjacent to the core poles and gaps are defined between the armature and the respective core poles so that the magnitude of a magnetic attraction moment on the armature generated by each electromagnet is the same for a given magnitude of the multi-phase current. The armature is disposed for moving the displaceable contact of the system switch for switching off the multi-phase current when the magnitude of the multi-phase current exceeding a predetermined trip value. A mounting mechanism mounts the armature for rotation about a point for presenting a restoring moment on the armature for returning the armature to a predetermined position defining the gaps, wherein the restoring moment presented by the mounting mechanism corresponds to the sum of the magnetic attraction moments on the armature generated by the respective current phases when the magnitude of the multi-phase current equals the predetermined trip value.

6 Claims, 5 Drawing Sheets

MULTI-PHASE CURRENT MONITORING DEVICE

CROSS REFERENCE TO RELATED APPLICATIONS

The present application claims the rights of priority with respect to application Serial No. P 40 14 820.3 filed May 9, 1990 in Germany, the subject matter of which is incorporated herein by reference.

BACKGROUND OF THE INVENTION

The present invention relates to an electronic device which monitors a multi-phase current with respect to an average value relating simultaneously to all current phases and which puts out a reliable signal even if a predetermined trip value is exceeded only slightly.

Prior art electronic devices of this type are known, however, they are not sufficiently reliable from a signalling technology point of view so that they must be designed in a multi-channel configuration and thus are complicated and expensive and/or do not operate sufficiently quickly.

SUMMARY OF THE INVENTION

It is an object of the present invention to provide a device for simple, single-channel, reliable and fast, three or more phase current monitoring with reference to an average value for all phases, independently of the frequencies of the currents, including f=0.

The above and other objects are accomplished according to the invention by the provision of an overcurrent relay device for monitoring current in a multi-phase current system including separate conductors each carrying a respective one of the current phases between a multi-phase current source and a load, comprising: a system switch coupled to the multi-phase current source and having a displaceable contact for switching the multi-phase current on and off; a plurality of electromagnets each including a magnetic core having a core pole and being associated with a respective one of the conductors for generating a magnetic attraction force in the vicinity of the core pole, the core poles all facing in the same direction; an armature rotatably mounted adjacent to the core poles and defining gaps between the armature and the respective core poles so that the magnitude of a magnetic attraction moment on the armature generated by each electromagnet is the same for a given magnitude of the multi-phase current, the armature being disposed for moving the displaceable contact of the system switch for switching off the multi-phase current when the magnitude of the multi-phase current exceeds a predetermined trip value; and mounting means mounting the armature for rotation about a point for presenting a restoring moment which is exerted on the armature for returning the armature to a predetermined position defining the gaps, wherein the restoring moment presented by the mounting means corresponds to the sum of the magnetic attraction moments on the armature generated by the respective current phases when the magnitude of the multi-phase current equals the predetermined trip value.

The invention will now be described in greater detail for a three-phase system and with reference to the drawing figures.

DETAILED DESCRIPTION OF THE PREFERRED EMBODIMENT

Figure 1:
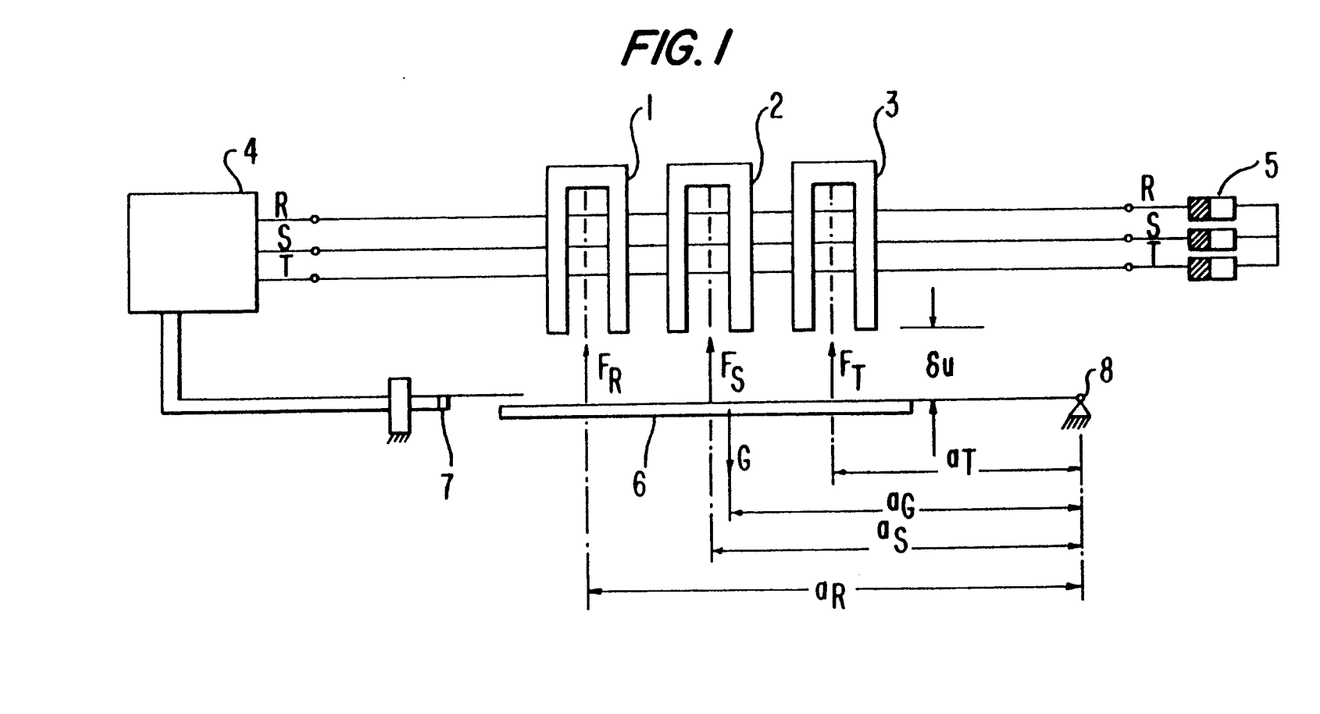
FIG. 1 is a schematic illustrating the basic structure of the overcurrent relay according to the invention.

FIG. 1 shows the basic configuration of an overcurrent relay according to an embodiment of the invention as well as its connections to a pulse inverter 4 and a load 5. The overcurrent relay is realized by a triple electromagnet arrangement, with the current in each phase being conducted separately through one of three U-shaped soft iron cores 1, 2 and 3. If the current values reach or exceed a predetermined trip value, the electromagnetic attraction generated by the triple electromagnet arrangement is greater on an armature 6 lying below the U-legs than the downward earth attraction (gravity) vector G on the armature so that the armature is attracted toward the poles of the electromagnets. During its upward movement, armature 6 opens an appropriately arranged contact 7, thus giving pulse inverter 4 a reliable signal to switch off the multi-phase current.

At one end, the armature of the relay is rotatably mounted in a bearing 8. The condition for tripping of the relay is met if the sum of the attraction moments exerted on armature 6 by the three individually excited soft iron cores 1, 2 and 3 is greater than the torque generated by the gravity vector G acting on armature 6.

$$F_R \cdot a_R + F_S \cdot a_S + F_T \cdot a_T = M \geq G \cdot a_G \qquad \text{(Eq.1)}$$

where $F_{R/S/T}$: magnetic attraction forces

G: weight of the armature $a_{R/S/T/G}$ spacing between the points of attack of the forces and the armature pivot point M: resulting torque generated by magnetic attraction forces The attraction forces generated by the individual conductor currents can also be approximated by way of the following equation:

$$F_u = \frac{\mu_o^2 \cdot i_u^2 \cdot A}{2 \cdot \delta_u} \qquad \text{(Eq. 2)}$$

where

A: cross-sectional area of the poles of the soft iron cores $F_u$: attraction force generated by soft iron core u $\mu_o$: permeability constant $i_u$: current in conductor u $\delta_u$: distance between armature and core u u: substitute index for conductor identification R, S, T The above is based on a few simplified assumptions which, among other things, assume an ideal homogeneous magnetic field distribution to exist underneath the core poles. Therefore, the above equation can be utilized only for a basic dimensioning estimate but not with sufficient accuracy directly for the quantitative mathematical determination of the attraction forces. Yet it is possible to derive therefrom an approximate statement about the relative relationships between current $i_u$ and attraction force $F_u$ as well as the air gap $\delta_u$ (distance between armature and core):

$$F_u = k_u i_u^2, \quad \delta_u = \text{constant} \tag{Eq. 3}$$

where $k_u$: a defined constant, applicable for conductors and a U-shaped iron core u; determined by measurement $$F \sim \frac{1}{\delta_u^2}, \quad i_u = \text{constant} \tag{Eq. 4}$$

In the normal case, pulse inverter 4 produces a symmetrical three-phase current. The sum effect of the alternating currents which are offset in phase by $\frac{2}{3}\pi$ and are initially considered to be sinusoidal, produce a uniform thrust in the drive. In the overcurrent relay, each one of the cores 1, 2 and 3 exerts a pulsating attraction force on armature 6 corresponding to the square of the current curve (Eq. 3) as follows:

$$F_R = k_R i^2 \sin^2 \omega t \tag{Eq. 5}$$

$$F_S = k_S i^2 \sin^2 (\omega t + \tfrac{2}{3}\pi) \tag{Eq. 6}$$

$$F_T = k_T i^2 \sin^2 (\omega t + 4/3\pi) \tag{Eq. 7}$$

where t: running time

ω: radian frequency of the three alternating currents (from the pulse inverter)

i: peak value of the three alternating currents $k_{R/S/T}$: describes the relationship between $F_u$ and $i_u^2$ according to Equation 3, specifically for each one of the three U-shaped cores.

By inserting these values in Equation 1, one obtains the attraction moment of all three cores acting on the armature as follows:

$$M = k_R \cdot a_R \cdot i^2 \sin^2 \omega t + k_S \cdot a_S \cdot i^2 \sin^2(\omega t + 2/3\pi) + k_T \cdot a_T \cdot i^2 \sin^2(\omega t + 4/3\pi) \tag{Eq. 8}$$

The different spacings between the soft iron cores and the center of rotation of the armature are compensated by correspondingly smaller air gap settings relative to the center of rotation so that the same torque effect is produced by each current (symmetry matching):

$$k_R a_R = k_S a_S = k_T a_T = k \tag{Eq. 9}$$

where k: describes the same proportional relationship between M and $i^2$ for each individual core The sum M of the torque effects of the three current phases is thus a constant value which is dependent only on the current amplitude, as can be demonstrated as follows by inserting Equation 9 in Equation 8:

$$M = 1.5 k i^2 \tag{Eq. 10}$$

Figure 2A:
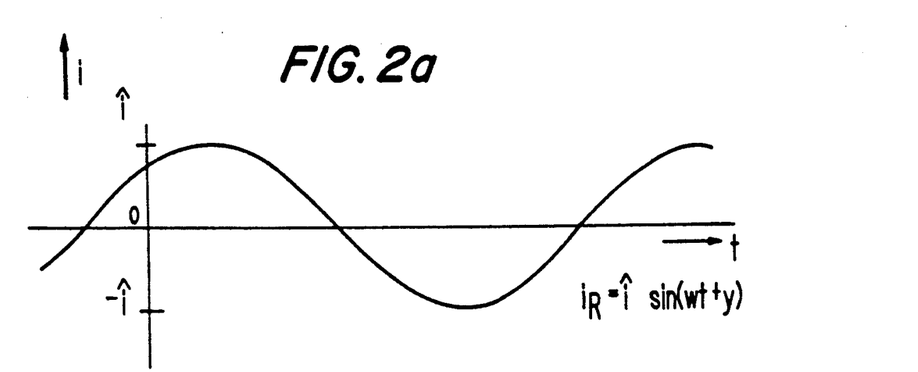
FIG. 2a illustrates a time curve for a sinusoidal current.
Figure 2B:
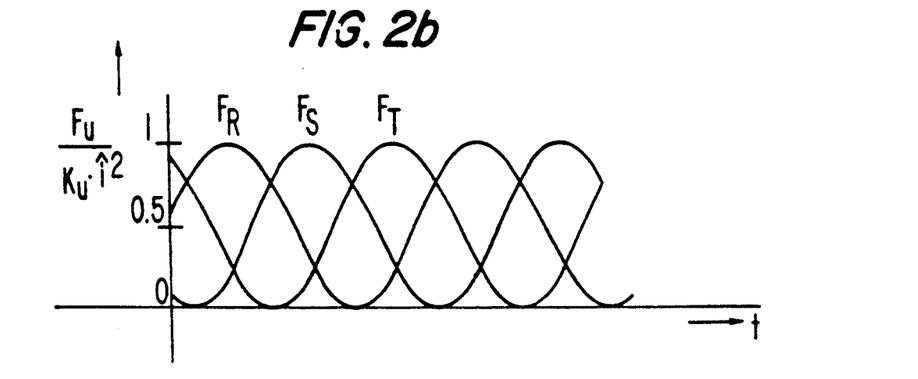
FIG. 2b illustrates curves of the three individual forces $F_R$, $F_S$ and $F_T$ for a sinusoidal current through coils R, S, T of FIG. 1.
Figure 2C:
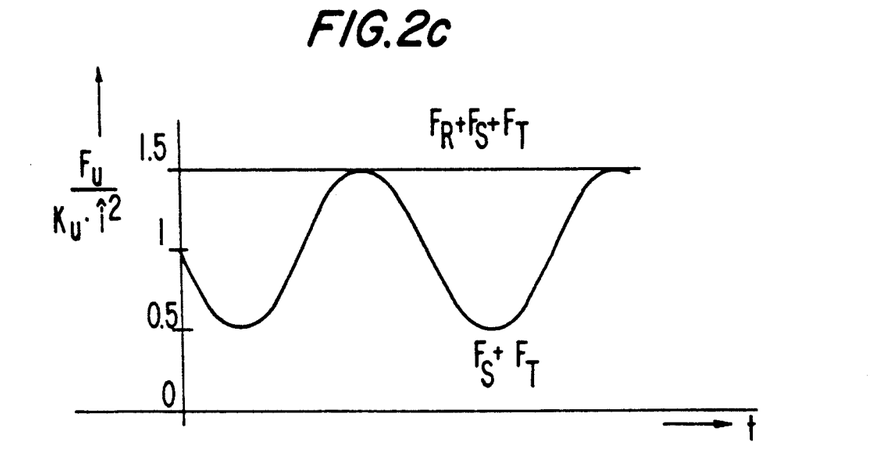
FIG. 2c illustrates the sum of the forces $F_R$, $F_S$ and $F_T$ of FIG. 2b.

FIG. 2 illustrates the development of this uniform attraction force on the armature, a force that is independent of the momentary phase position if the attraction forces of the individual phase are added symmetrically. The trip value for the relay is determined by the weight of the armature which produces the restoring moment (Equation 1). Thus, it is possible to continuously monitor the current amplitude since a uniform total attraction moment is exerted on the armature. This moment is influenced only by the current amplitude and is independent of the momentary value of the individual currents. If this moment which is unequivocally associated with a current amplitude or a current amount, respectively, is greater than the restoring moment generated by gravity, the relay is tripped:

$$1.5 k i_A^2 = G a_G \tag{Eq. 11}$$

where $i_A$: the peak value of the current from which the relay is tripped (corresponds to the trip value)

Because of the constant attraction moment which is independent of the periodicity of the alternating currents, it is thus possible, without limitation, to perform current monitoring also at any desired low frequency.

Figure 4:
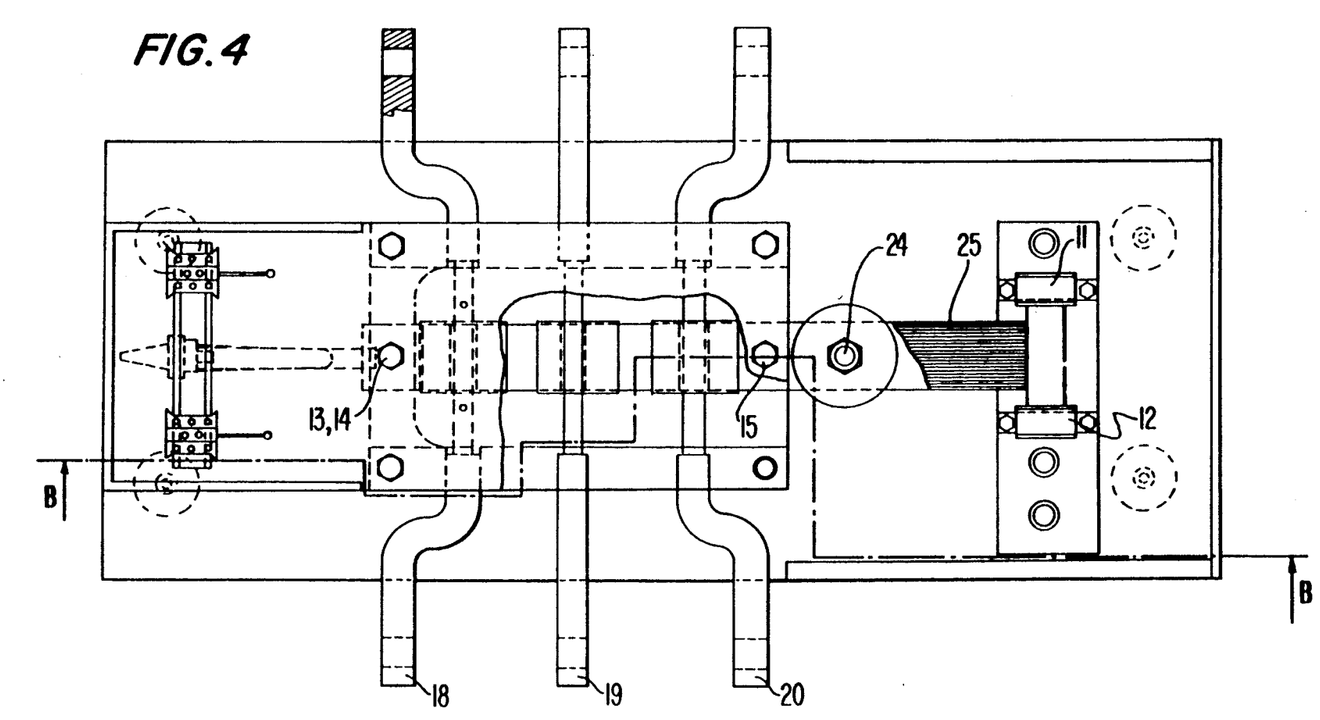
FIG. 4 is a top view of an embodiment of the invention employed in a linear motor.
Figure 5:
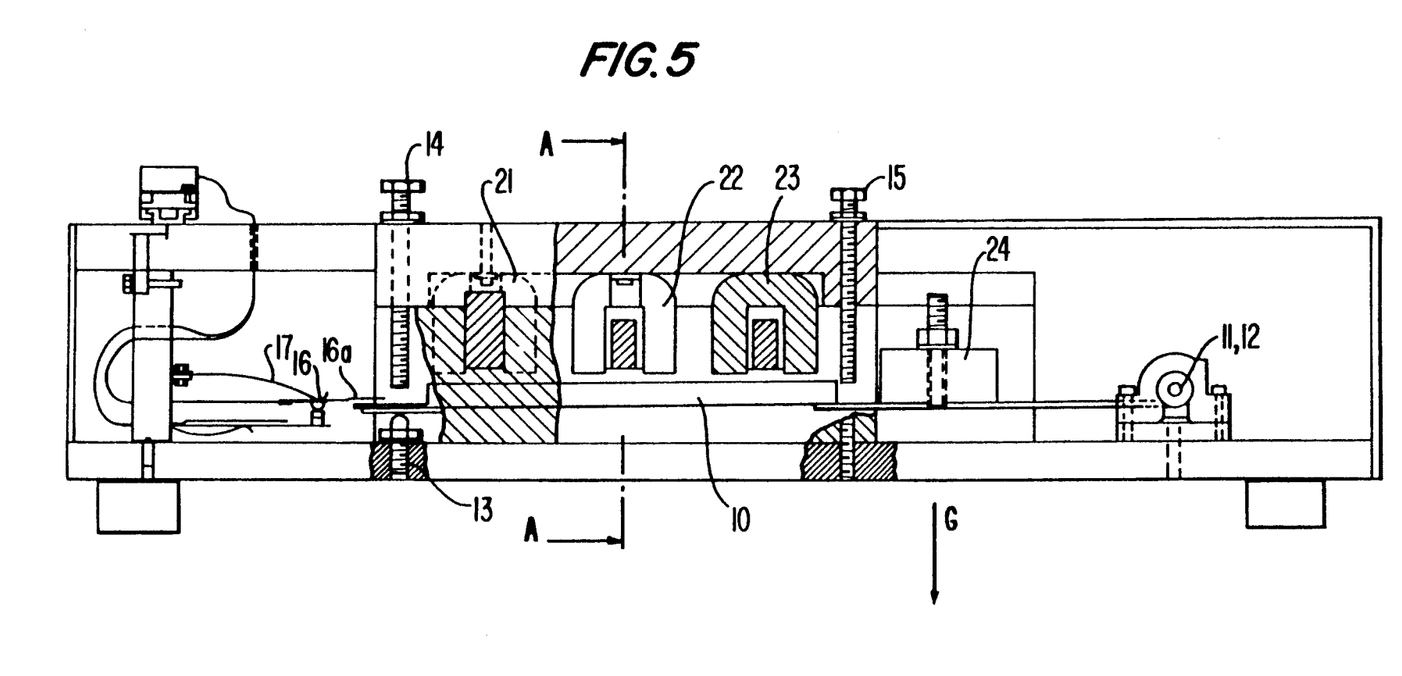
FIG. 5 is a sectional view along lines B—B of the embodiment of FIG. 4.
Figure 6:
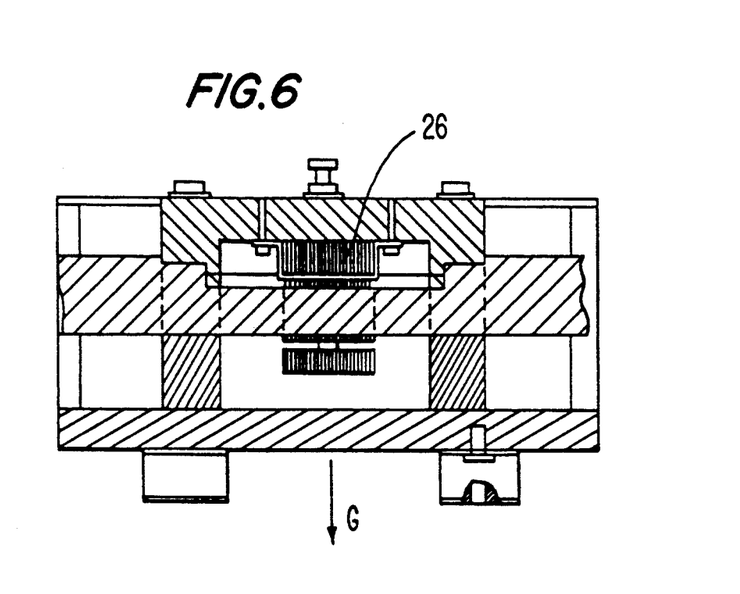
FIG. 6 is a sectional view along line A—A of FIG. 5.

FIGS. 4, 5 and 6 show an exemplary configuration of the relay according to the invention as it may be employed as an overcurrent relay for the long stator motors of magnetic levitation trains. There they serve the purpose of generating a signal for switching off excess currents which would lead to an excessive acceleration of magnetic levitation trains. This signal is employed to switch off the pulse inverter that feeds the pulse stator windings.

Because of the utilization of gravity for the armature restoring moment, the relay can be employed only in an installed position that corresponds to this function, with the earth attraction vector G shown in the drawings being oriented downwardly. Armature 10 is mounted at one end in two ball bearings 11 and 12 so as to be rotatable about a horizontal transverse axis. Armature 10 is limited in its possible rotary motion downwardly ("lower rest position") by an adjusting screw 13 and upwardly ("attracted position") by adjustment screws 14 and 15. The upper limitation prevents the armature from getting closer than about 2 mm to the pole faces of the U-shaped cores disposed thereabove so as not to subject the armature to a strong mechanical stress upon further approach, since the increase in the attraction force is here particularly high.

On the side facing away from the center of rotation, armature 10 projects to such an extent that, when it moves upward into the attracted position, it carries along a movable part 16a of an appropriately disposed contact 16 and opens the contact against the force of a contact spring 17. Mechanical contact between armature 10 and movable contact part 16a takes place after about one-half a stroke of the armature through the air gap between the armature and the pole faces of U-shaped iron cores 21, 22 and 23. The armature is electrically insulated in the region of contact 16 for potential separation.

The three current phases from the pulse inverter are conducted via copper rails 18, 19 and 20 through the respective U-shaped cores 21, 22 and 23. In the region of the U-shaped cores, the copper rails are fully insulated in order to maintain the required air gap and creep paths and in the outer region they are fastened to the insulated frame of the overcurrent relay.

The arrangement of the conductors, U-shaped cores and armatures is initially determined by the following electrical and magnetic data:
 conductor cross section corresponding to the effective current load;
 conductor spacing and insulation corresponding to the given voltage load;
 sufficient spacing between the U-shaped cores to prevent undesirable direct magnetic influences on one another.

In view of the requirement for reliable separation of the relay contacts when the trip value is exceeded, and for the least possible influence by the contact spring force on the attraction process, the stroke of the armature (air gap between armature and pole faces of the U-shaped iron cores in the lower rest position) has been set to be at least 6 mm. When the current amplitude reaches the trip value, the armature initially travels from its lower rest position over about 50% of its stroke before it carries along the movable contact part 16a of contact 16. The arrangement can also be adjusted appropriately by simple means without special requirements for dimensional tolerances.

Due to the attraction force increasing quadratically with the decrease in air gap ($1/\delta_u$) (Equation 4), armature 10 is moved upwardly with an excess of torque that already corresponds to approximately three times the restoring moment caused by the weight of armature 10, assuming that the current corresponding to the trip value continues, as soon as armature 10 abuts on movable portion 16a of contact 16. (Upon reaching the tripping current, the moment is just sufficient to lift the armature and when the air gap is reduced to one half, the moment is at its quadruple value.)

With a air gap in the stated range of magnitude in the lower rest position of armature 10, the trip value of the current can be set with good reproducibility since inaccuracies on the return path of the armature to the lower rest position contribute only insignificantly in relation to the total air gap between the U-shaped cores and the armature. For example, a change in the rest position by 0.1 mm has an effect on the relative change in air gap at $\delta_u = 6$ mm of 1.7%, with a corresponding relative change in the trip value of 1.7% (Equation 3 and Equation 4).

The length of the armature is initially determined by the necessary distance between individual U-shaped cores. Furthermore, the distance from the center of rotation is selected to be sufficiently large so that the air gaps (in the lower rest position) between armature 10 and the individual U-shaped cores 21, 22 and 23 lie in the same order of magnitude. The remaining dimensions of the armature are based essentially on reasons of sufficient (over-dimensioned) mechanical stability.

The restoring moment is effected by way of the weight of the armature. In order to be able to set the restoring moment independently of the dimensions, additional weights 24 may be attached to the armature. The restoring moment is sufficiently great to make available a sufficient force to actuate the contact 16. As mentioned above, the available actuating force for contact 16 is a direct function of the available restoring moment.

The restoring force on the contact carrier side of armature 10 for weights and dimensions of an armature realized in practice, including the counterweight, lies at about 1.5N. The static force for carrying along movable contact part 16a is thus about 5N. This force lies clearly above the value customarily generated for this type of contact in signal relays so that proper contact actuation is ensured.

The required cross-sectional area of the iron of the U-shaped cores results correspondingly (Equation 2) from the force to attract the armature against its own weight for a given current (trip value) and air gap.

A prerequisite for the relay characteristics described by Equations 2, 3 and 4 is the assumption that the magnetic resistance of the iron is negligible compared to that of the air gap. This applies for the materials employed only under the condition that the saturation induction is not exceeded. In the described magnetic circuit, the highest induction values occur in the armature due to the cross-sectional area there being noticeably smaller than in the core flux concentration.

The armature cross section is therefore dimensioned sufficiently large so that iron saturation in the armature occurs only if the air gap is less than the value at which the contacts are already open or if a current flows that is far above the trip value. That is, the deviations caused by iron saturation relative to the stated relationships between attraction force and current or air gap, respectively (less increase in force) have no influence on the tripping behavior of the relay.

In principle, the overcurrent relay operates independently of the frequency of the current. In order to avoid any adverse influence on the attraction forces by eddy current effects and changes in the magnetic field distribution connected therewith at high frequencies, the cores and armatures are produced of laminated iron sheets 25, 26 (FIGS. 4 and 6).

As described above, the relationships between current and attraction force can be determined only approximately from Equation 2. A precise theoretical determination is connected with high expenditures for computer work. Moreover, a setting of correspondingly calculated and thus precisely checked geometric dimensions (air gap) an weights can be made only at high expenditures for precision engineering work.

The trip value is therefore set by a direct measurement of the current at which the relay is just tripped. For this purpose, the current is initially set to below the trip value, is increased continuously until tripping occurs and the appropriate current at the moment of tripping is determined.

Proper operation of the relay is given only if each one of the three individual currents exerts the same attraction force on the armature. Only in that case is the tripping sensitivity independent of the momentary phase position of the three-phase current system (see Equations 8 to 10).

This setting considers the different distances between the points of force attack ("lever arms") of the U-shaped iron cores 21, 22 and 23 and the center of rotation and is effected by varying the air gaps. The basis is a preliminary rough setting (approximately 6 to 7 mm). The relative symmetry setting of the air gaps is effected in that current is carried through only one of the three conductors and thus the same trip value is set in succession for each one of the conductors.

The three air gaps are varied relative to one another by changing the lower rest position of the armature in that adjustment screw 13 is adjusted for the lower rest position and possibly by changing the position of one of the U-shaped cores in the vertical direction. The absolute trip value used operationally is not significant for the symmetry setting of the air gaps.

The setting of the absolute tripping current is effected after the symmetry setting. This setting is effected by way of a change in the restoring moment $G \cdot a_G$ produced by the weight of the armature in that additional weights are attached to the armature or removed from it. This does not interfere with symmetry (Equation 1); rather this measure has the same uniform result for all three conductors.

The trip value is set directly during three-phase operation or, if one conductor is connected, with an appropriately excessive tripping current.

According to its purpose, the overcurrent relay reliably does not respond if the maximum drive thrust determined by the rated current of the pulse inverter is not exceeded. Temporarily exceeded current limits during operation, particularly current harmonics and asymmetries in the three-phase system either result only in temporary acceleration peaks of a duration that is of n significance for motion dynamics or they do not contribute at all to the generation of the driving force. The relay should not be tripped either by such operationally occurring current curves which deviate from the ideal case unless the expected maximum thrust is exceeded.

On the other hand, reliable tripping occurs in the case where currents flow which could produce excessive thrust (overcurrents). This also applies for the case of irregular current curves (e.g. absence of one phase).

Up to a defined tolerance range around the trip value, the relay reliably does not respond below the threshold but does respond reliably above it.

The initial assumption made above that the currents furnished by the pulse inverter are sinusoidal is in no way assured. Rather, the pulse inverter furnishes currents that include harmonics, with the major portion being harmonics that are generated by intermediate keying in order to set the voltage.

Figure 3:
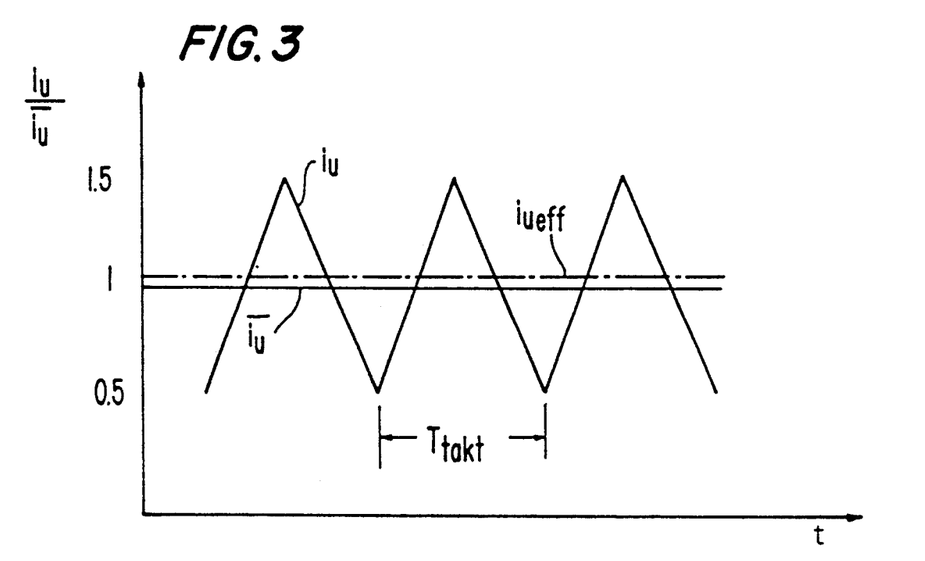
FIG. 3 shows the current curve of a pulse inverter for the drive of a magnetic train.

The effect of the intermediate keying of the pulse inverter is shown clearly in FIG. 3. The momentary value (of the fundamental mode) to be associated with an amplitude value and the momentary phase position should be considered as the average current $i_u$ of the approximately triangular current curve $i_u$. Current $i_u$ follows the (sinusoidal) fundamental mode curve on which is superposed the higher frequency (about 300 Hz) current component generated by the keying. The curve shown in FIG. 3 represents an "instantaneous image" of the current curve.

For the driving behavior, a current curve corresponding to the average current value $i_u$ can be assumed as the basis since only the fundamental mode contributes to the driving force. The superposed current component produced by the intermediate keying merely produces correspondingly high frequency (300 Hz) alternating forces. It has no influence on the driving thrust.

With respect to the attraction force acting on the armature of the overcurrent relay with which a certain driving thrust must be unequivocally associated, this additional superposed intermediate keying current also acts as an additional alternating component which, because of the mass of the armature, does not cause a significant change in the tripping behavior (with respect to current $i_u$).

Because of the relationship between current and attraction force which, in contrast to the formation of the driving thrust, is not linear but quadratic, this superposition of harmonics, however, increases the average value of the attraction force.

Using Equation (3), $F_u = k_u \cdot i^2_u$, the following applies:

$$F_u = k_u \overline{i_u^2} = K_u \cdot i_{u,eff}^2 \qquad \text{(Eq. 12)}$$

where $$i_{u,eff} = \sqrt{\frac{1}{T_{takt}} \int_0^{T_{takt}} i_u^2 \, dt}$$

is the effective current value and $T_{takt}$: the period duration of the pulse inverter intermediate keying pulse.

In principle, the following applies in every case:

$$i_{u,eff} \geq \overline{i_u} \qquad \text{(Eq. 13)}$$

In the example shown in FIG. 3, the relationship is the following:

$$0.96 i_{u,eff} \geq \overline{i_u} \qquad \text{(Eq. 14)}$$

This results in an increase of the attraction force on the armature by a factor of 1.04, while, as indicated above, the driving thrust remains uninfluenced by the harmonics.

The current harmonics generated by intermediate keying which differ depending on the operational state, the long stator section traversed and length of the train and its load, may therefore lead to a slight shift of the response threshold of the relay toward lower fundamental mode current values. In the curve shown in FIG. 3, tripping would occur already at 96% of the set trip value. However, this intermediate keying amplitude assumed in the illustrated example is not realized under operational conditions.

In addition to the current harmonics generated by the intermediate keying, other deviations of the current curve from the sinusoidal shape also occur during operation. However, they contribute only insignificantly to the effective current value and can therefore be neglected.

In the case of malfunction, the current harmonic components may noticeably increase. This always leads to tripping of the relay at lower fundamental mode current contributions, that is at lower thrust values. It is therefore possible that the relay responds prematurely as a result of a malfunction in the drive system.

An asymmetry in the three-phase current system, that is, not maintaining a phase shift of $\frac{2}{3}\pi$ or different amplitudes in the three currents also leads to an increase in the ratio of armature attraction force to actually generated driving thrust at the vehicle. Response occurs in this case at a lower driving thrust. This can be explained in that, starting from a certain current amplitude value, the maximum thrust at the vehicle is realized if there is symmetry. Deviations from symmetry without loss of thrust can be compensated only by increases in the current amplitude (averaged for the three phases) which, however, leads to correspondingly higher attraction forces on the relay armature.

If the current slightly exceeds the trip value, the relay armature begins moving upward. This again increases the attraction force proportionally to $(1/\delta_u)^2$, causing the acceleration of the armature to increase considerably. This relationship shows immediately that considerable time is required for the start of movement from the lower rest position from the moment that the trip value is exceeded until the contacts are separated and the attracted position is reached. The initial acceleration is determined by the extent to which the trip value was exceeded.

Based on the fact that the inertia of the armature corresponds approximately to the restoring moment as a function of gravity (i.e., the contribution of the counterweight required for adjustment purposes to the total weight is low), the following applies for the initial acceleration:

$$b_1 = \left[\left(\frac{\hat{i}}{\hat{i}_A}\right)^2 - 1\right] \cdot g \qquad \text{(Eq. 15)}$$

where g: acceleration of the earth = 9.81 m/s²
$\hat{i}$: peak current value
$\hat{i}_A$: relay trip value (peak value)
$b_1$: acceleration of the armature at the beginning of the movement When the trip value is exceeded by 1% the armature is already accelerated from the lower rest position at 0.02 g≈0.2 m/s². Under consideration of the above mentioned increase in the attraction force which is proportional to $(1/\delta_u)^2$, the upper (attracted) position of the armature is reached in this case after no more than 200 ms. The reaction time is shortened considerably if the trip value is exceeded to a greater degree. For example, at 1.05 times the trip value (exceeded by 5%), the expected reaction time lies below 50 ms.

The use of the relay according to the invention is not limited to magnetic levitation train drives. Rather, it can be employed in all multi-phase current monitoring systems. It is also possible to drive a mechanical or electronic circuit breaker directly by means of armature 10.

Obviously, numerous and additional modifications and variations of the present invention are possible in light of the above teachings. It is therefore to be understood that within the scope of the appended claims, the invention may be practiced otherwise than as specifically claimed.

What is claimed is:

1. An overcurrent relay device for monitoring current in a multi-phase current system including separate conductors each carrying a respective one of the current phases between a multi-phase current source and a load, comprising:

a system switch coupled to the multi-phase current source and having a displaceable contact for producing a signal to switch off the multi-phase current;

a plurality of electromagnets each including a magnetic core having a core pole and being associated with a respective one of the conductors for generating a magnetic attraction force in the vicinity of said core pole, said core poles all facing in the same direction;

an armature rotatably mounted adjacent to said core poles and defining gaps between said armature and the respective core poles so that the magnitude of a magnetic attraction moment on said armature generated by each electromagnet is the same for a given magnitude of the multi-phase current, said armature being disposed for moving the displaceable contact of the system switch for producing the signal to switch off the multi-phase current when the magnitude of the multi-phase current exceeds a predetermined trip value; and mounting means mounting said armature for rotation about a point for presenting a restoring moment on said armature which is generated substantially only by the force of gravity, for returning said armature to a predetermined position defining the gaps, wherein the restoring moment presented by said mounting means corresponds to the sum of the magnetic attraction moments on said armature generated by the respective current phases when the magnitude of the multi-phase current equals the predetermined trip value.

2. A device as defined in claim 1 forming a combination with a magnetic levitation train system including copper rails each carrying a respective one of the current phases, wherein said magnetic cores are each U-shaped and the rails each pass through a respective one of the U-shaped magnetic cores.

3. A device as defined in claim 1, wherein said magnetic cores are each U-shaped with a respective one of the conductors passing therethrough.

4. A device as defined in claim 1, wherein said mounting means includes bearing means having a horizontal axis and said armature has one end fixed to said bearing means for rotary motion about the horizontal axis.

5. A device as defined in claim 4, wherein said armature has another end opposite to said one end which is positioned for displacing the displaceable contact of the system switch.

6. A device as defined in claim 4, wherein the core poles of the respective magnetic cores are located at different distances from the horizontal axis and the gaps between said armature and the respective core poles are set so that equal magnetic attraction moments are created on said armature by the respective electromagnets.

* * * * *